(12) United States Patent
Rei

(10) Patent No.: US 7,252,692 B2
(45) Date of Patent: Aug. 7, 2007

(54) PROCESS AND REACTOR MODULE FOR QUICK START HYDROGEN PRODUCTION

(76) Inventor: Min-Hon Rei, No. 64-8, Alley 140, Lane 101, Sec. 4, Hsin-Hai Rd., Taipei (TW)

( * ) Notice: Subject to any disclaimer, the term of this patent is extended or adjusted under 35 U.S.C. 154(b) by 332 days.

(21) Appl. No.: 10/761,789

(22) Filed: Jan. 21, 2004

(65) Prior Publication Data
US 2005/0158236 A1 Jul. 21, 2005

(51) Int. Cl.
*C01B 3/02* (2006.01)
(52) U.S. Cl. .................... 48/61; 48/127.7; 48/127.9; 48/197 R; 48/198.1; 423/648.1; 423/652; 423/653; 422/177
(58) Field of Classification Search ........ 422/188–198, 422/201–211; 48/94, 127.9; 423/650–655
See application file for complete search history.

(56) References Cited

U.S. PATENT DOCUMENTS

| 5,525,322 | A | * | 6/1996 | Willms ................. 423/653 |
| 5,861,137 | A | | 1/1999 | Edlund |
| 6,207,132 | B1 | * | 3/2001 | Lin et al. .............. 423/648.1 |
| 6,468,480 | B1 | * | 10/2002 | Clawson et al. ........... 422/211 |
| 2003/0068260 | A1 | | 4/2003 | Wellington et al. |
| 2003/0068269 | A1 | | 4/2003 | Matzakos et al. |

FOREIGN PATENT DOCUMENTS

| CN | 96245413.3 | | 11/1997 |
| CN | 94112487.8 | | 11/1999 |
| EP | 1561725 | * | 10/2005 |
| WO | WO9943610 | * | 9/1999 |

* cited by examiner

*Primary Examiner*—Glenn Caldarola
*Assistant Examiner*—Vinit H Patel
(74) *Attorney, Agent, or Firm*—Klein, O'Neill & Singh, LLP; Howard J. Klein

(57) ABSTRACT

A shell and tube reactor module for hydrogen production is provided. The shell and tube reactor module includes a reactor having a shell side, at least one palladium membrane tube as a tubular section, and a steam reforming catalyst in the shell side, wherein the at least one palladium membrane tube has one sealed end located at upstream of flowing path

17 Claims, 3 Drawing Sheets

PROCESS AND REACTOR MODULE FOR QUICK START HYDROGEN PRODUCTION

FIELD OF THE INVENTION

The present invention relates to a process and a shell and tube reactor module for catalytically quick-started hydrogen production, and more particularly to a process and a shell and tube reactor module for substantially increasing flux of hydrogen.

BACKGROUND OF THE INVENTION

Conventional steam reforming reaction for producing hydrogen requires substantial amount of energy supply from an external heating system and an additional purification facility, such as pressure swinging absorber (PSA) or cryogenic purifier, to attain the desired purity of 95 to 99.995%. Since the external facilities generally occupy a larger share of the capital investment and the plant space, a membrane assisted steam reformer is incorporated to provide simplification in the hydrogen purification system. Lately, additional development focuses on in-situ heating by conventional combustion of fuel or spent gases of the reformer inside the reformer to provide the energy required for the endothermic steam reforming reaction disclosed on US patent application publication Nos. US2003/0068260 A1 and US2003/0068269 A1. In U.S. Pat. No. 5,861,137, a small burner is provided to burn the fuel or vent product gases to provide the needed thermal energy; however, it produces dangerous open flame and NOx polluting product. In US patent application publication No. US2003/0068629 A1, the flameless burning is provided by preheating the fuel and air to a temperature above the autoignition temperature of the mixture. Apparently, the foresaid developments still suffer severe shortcomings including the hazard of vapor phase combustion and the generation of noxious pollutants, nitrogen oxides, NOx from the vapor phase air combustion.

In order to overcome the foresaid drawbacks, the present invention provides a process and a shell and tube reactor module to produce hydrogen with high purity (99.99%). Furthermore, the present invention provides a process and a shell and tube reactor module having a combustion section which can rapidly reach to a high temperature sufficient to initiate an endothermic steam reforming reaction in a very short time.

SUMMARY OF THE INVENTION

In accordance with an aspect of the present invention, a shell and tube reactor module for hydrogen production is provided. The shell and tube reactor module includes a reactor having a shell, at least one inlet, at least one outlet, a flowing path in the shell side extending from the at least one inlet to the at least one outlet and a proper number of palladium membrane tubes as a tubular section for intrinsic purification of hydrogen product, wherein the palladium membrane tube has one sealed end located upstream of the flowing path of hydrogen inside the tube as well in the shell side of the reactor. The shell side of the reactor is filled with a steam reforming catalyst for production of crude hydrogen product from steam and a proper fuel such as methanol or hydrocarbons. The combustion section of the shell and tube reactor module is used to contain a reactive oxidation catalyst for catalytic combustion to supply thermal energy for the endothermic steam reforming reaction taking place inside the shell section of the reactor.

Preferably, the palladium membrane tube is deposited on a porous support.

Preferably, the porous support is formed of stainless steel.

Preferably, a length of said at least one tube is between 3 cm and 120 cm.

Preferably, at least one inlet is configured to receive a feed selected from a group consisting of water, a fuel and a mixture thereof, and at least one outlet is configured to discharge the hydrogen.

Preferably, the fuel is selected from a group consisting of ethanol, methanol, isopropanol, hexane, gasoline, methane and a mixture thereof.

Preferably, the steam reforming catalyst is $CuOZnOAl_2O_3$, $PdOCuOZnOAl_2O_3$ or $K_2O$, $NiO/\gamma-Al_2O_3$.

Preferably, the shell and tube reactor module further comprises a catalytic combustion section having a noble metal and boron nitride catalyst dispersed on a supporting material for heating the reactor.

Preferably, the noble metal is selected from a group consisting of platinum (Pt), palladium (Pd), rhodium (Rh), Ruthenium (Ru) and a mixture thereof.

Preferably, the supporting material is one selected from a group consisting of $\gamma$-alumina, titania, zirconia, silica, commercial oxidation catalysts, such as DASH220 (NE Chemtec, Inc of Japan) and N220 (Süd Chemie Catalysts, Japan, Inc).

In accordance with another aspect of the present invention, an assembly of shell and tube reactor modules for hydrogen production is provided. The assembly of shell and tube reactor modules includes two shell and tube reactor modules assembled together in a mirror image arrangement, wherein the assembly has two bottom terminal openings, the internal tube sections and catalyst filled therein. The feed is introduced at the central section and flow in mutually opposite directions. Furthermore, the sealed ends of the palladium tubes of the two shell and tube reactor modules are at the upstream of flowing path in the two reactors.

Preferably, the palladium membrane which is covered on the at least one tube is mounted on a porous support.

Preferably, the porous support is formed of stainless steel.

Preferably, a length of the at least one tube is between 3 cm and 120 cm.

Preferably, the at least one inlet is configured to receive feed selected from a group consisting of water, a fuel and a mixture thereof, and said at least one outlet is configured to discharge the hydrogen.

Preferably, the fuel is selected from a group consisting of ethanol, methanol, isopropanol, hexane and gasoline, methane and a mixture thereof.

Preferably, the steam reforming catalyst is $CuOZnOAl_2O_3$, $PdOCuOZnOAl_2O_3$ or $K_2O$, $NiO/\gamma-Al_2O_3$.

Preferably, the assembly of shell and tube reactor modules further comprises a catalytic combustion section having a noble metal catalyst dispersed on a supporting material to heat the reactors.

Preferably, the noble metal is selected from a group consisting of platinum (Pt), palladium (Pd), rhodium (Rh), Ruthenium (Ru) and a mixture thereof.

Preferably, the supporting material is one selected from a group consisting of $\gamma$-alumina, titania, zirconia, silica, commercial oxidation catalysts such as DASH220 (NE Chemtec, Inc. Japan) and N220 (Süd Chemie Catalysts, Japan, Inc.).

In accordance with another aspect of the present invention, a process of hydrogen production is further provided. The process includes steps of feeding a fuel into a shell and tube reactor module including a shell containing steam reforming catalyst and at least one palladium membrane tube with one sealed end located at the upstream of the flowing path in the catalyst zone.

Preferably, the palladium membrane tube is formed by depositing a membrane on a porous stainless steel support, wherein the membrane is made of one of palladium, palladium-silver alloy and palladium-copper alloy.

Preferably, the porous support is formed of stainless steel.

Preferably, the length of the palladium membrane tube is between 3 cm and 120 cm.

Preferably, the fuel is selected from a group consisting of ethanol, methanol, isopropanol, hexane, gasoline, methane and a mixture thereof.

Preferably, the steam reforming catalyst is $CuOZnOAl_2O_3$, $PdOCuOZnOAl_2O_3$ or $K_2O$, $NiO/\gamma-Al_2O_3$.

Preferably, the process further includes a catalytic combustion section having a noble metal catalyst dispersed on a supporting material to heat the reactor.

Preferably, the noble metal is selected from a group consisting of platinum (Pt), palladium (Pd), rhodium (Rh), Ruthenium (Ru) and a mixture thereof.

Preferably, the supporting material is one selected from a group consisting of γ-alumina, titania, zirconia, silica, commercial oxidation catalysts such as DASH220 (NE Chemtec, Inc. Japan) and N220 (Süd Chemie Catalysts, Japan, Inc.).

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The invention is described more specifically with reference to the following embodiments. It is to be noted that the following descriptions of preferred embodiments of this invention are presented herein for the purpose of illustration and description only; it is not intended to be exhaustive or to be limited to the precise form disclosed.

Figure 1:
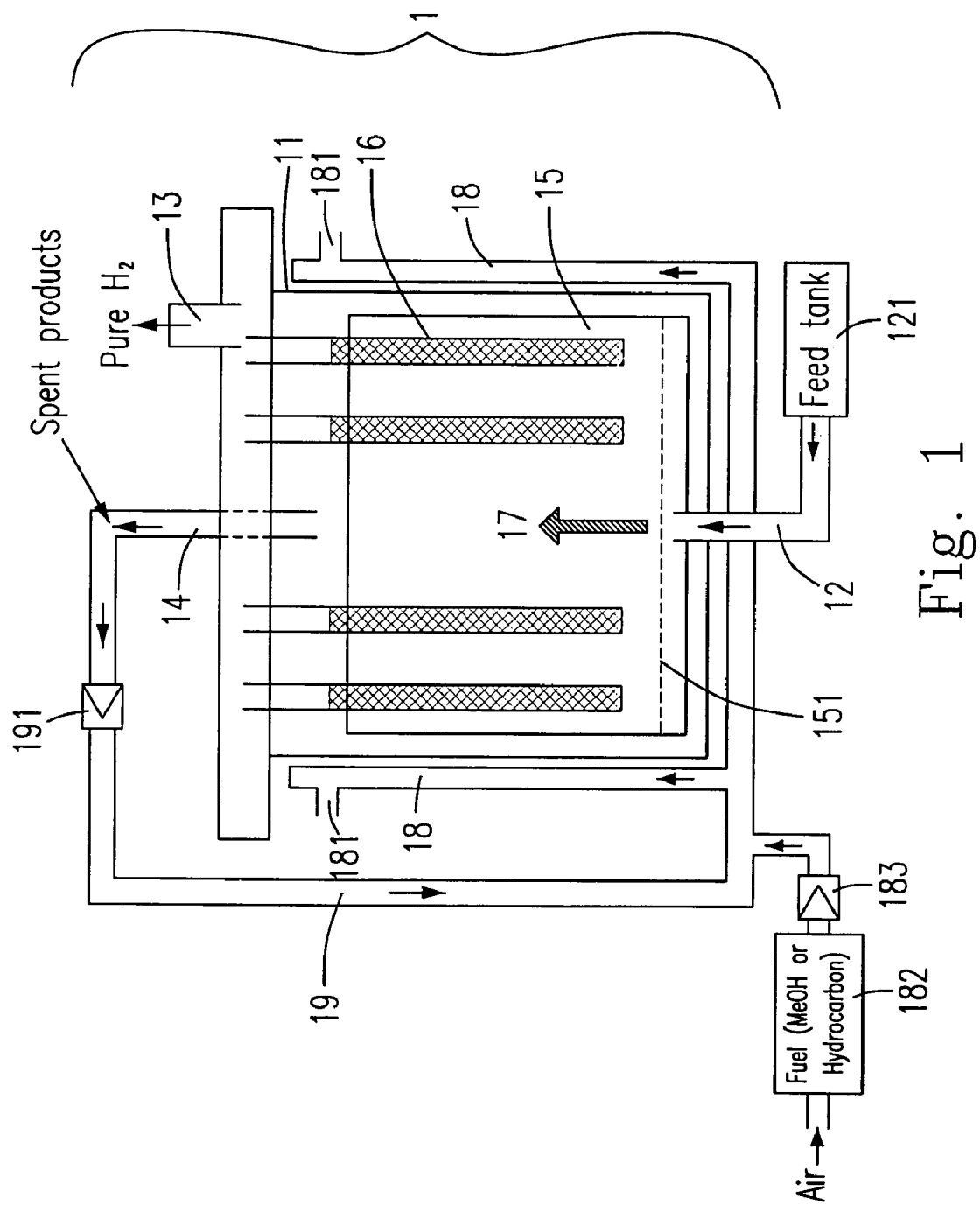
FIG. 1 is a schematic view showing a shell and tube reactor module for hydrogen production according to the present invention.

One preferred embodiment of the present invention is shown in FIG. 1. The shell and tube reactor module 1 includes a reactor 15 having a shell 11 with an inlet 12, an outlet 13 and a vent 14, a flowing path 17 extending from the inlet 12 to the one outlet 14, and having several palladium membrane tubes 16. The palladium membrane deposited on each of the tubes is used for purifying hydrogen, wherein each tube has one sealed end located upstream of the flowing path 17. The shell and tube reactor module 1 further includes catalytic combustion sections 18 for heating the reactor 15. The inlet 12 is configured to receive a feed composed of steam and a fuel after the feed is pumped from a feed tank 121 and is properly heated to the desirable reaction temperature by heat exchanged in the catalytic combustion sections 18 and with hot streams of pure hydrogen stream from the outlet 13 and the waste gases stream from the outlet 181. The fuel can be ethanol, methanol, isopropanol, hexane, gasoline or methane. The outlet 13 is configured to discharge pure hydrogen, and the vent 14 is configured to discharge spent products including $H_2$, CO and $CO_2$. The spent products discharged from the vent 14 are pressure reduced by a pressure reducer 191 and forwarded into the catalytic combustion sections 18 through a connection 19 for combustion. A proper amount of air is pumped first through a fuel reservoir 182, a check valve 183 and then into the connection 19 to mix with the spent products. The gases from the catalytic combustion section 18 is further vented through the outlet 181 for being discharged as waste gases or heat exchanged with the feed stream. The fuel in the fuel reservoir 182 can be alcohol such as methanol or liquid hydrocarbons such as gasoline, hexanes or naphtha oil.

The shell and tube reactor module further includes a steam reforming catalyst and a heat conductive perforated metal plate 151 welded to the reactor wall. Preferably, the steam reforming catalyst is $CuOZnOAl_2O_3$, $PdOCuOZnOAl_2O_3$ or $K_2O$, $NiO/\gamma-Al_2O_3$. The heat conductive plate facilitates heat transfer from the warmer reactor wall to the catalyst zone for the endothermic reaction.

In order to provide tubes having palladium membranes, the palladium membrane is prepared by the deposition of 3 to 25 μm thickness of palladium or palladium-silver membrane by plating and sputtering on surface of a porous stainless steel (PSS) tube. Preferably, an outside diameter of the palladium membrane tube is 9.5 mm and a length of the palladium membrane 150 mm. Furthermore, the palladium membrane tubs has one sealed end, which is arranged upstream of the flowing path to speed up the flow of hydrogen permeating from the sealed end to the open end. The crude hydrogen having 60-75% purity of hydrogen from reforming reaction permeates through the palladium membrane tubes to yield 99% to 99.99% purity of hydrogen. The high purity of hydrogen is directly derived in the membrane tube side without any additional purification facilities. The efficient purification of hydrogen by the palladium membrane is illustrated as follows.

EXAMPLE 1

Hydrogen Permeation of $H_2$—$CO_2$ Mixture

Hydrogen mixture containing different concentrations of carbon dioxide as 0, 20, 80, 30, 50, and 75% were used to study hydrogen permeation through a palladium membrane tube at 330° C. under a pressure of 2, 3, 4 and 5 bar in the shell side. The resultant hydrogen flux through the palladium membrane is shown in Table 1, and the permeance is calculated in a unit of $M^3/M^2\text{-hr-}P^{1/2}$. The experiment was carried out in a stainless steel tubular reactor with 25 mmOD×350 mmL (outside diameter×length) containing a palladium membrane tube of 9.525 mmOD×750 mmL. The hydrogen mixture is fed into the shell side of membrane, and then the pure hydrogen permeates through the membrane into the interior of the membrane tube. The permeation pressure is set by adjusting a back pressure regulator in the spent gas mixture stream before leaving the reactor system. Referring to Table 1, the hydrogen permeation from a feed of $H_2/CO_2$ mixture at 330° C. dropped half from 22 $M^3/M^2\text{-hr-}P^{1/2}$ to 10-11 $M^3/M^2\text{-hr-}P^{1/2}$ when hydrogen concentration in the feed was decreased from 99.995% to 70% or 50% and became negligible when hydrogen concentration in the feed was only 25%.

TABLE 1

Hydrogen permeation of $H_2/CO_2$ mixture with a palladium membrane.

| % $H_2$ in $H_2/CO_2$ | Flux, cc/min % $H_2$ purity | P1, absol., bars 3 | 4 | 5 | Permeance, $M^3/M^2 - Hr^{-1} - atm^{1/2}$ |
|---|---|---|---|---|---|
| 99.995 | Flux | 225 | 322 | 419 | 22.02 |
|  | % Purity |  | 99.9999 |  |  |
| 70 | Flux, | 83.3 | 111 | 168 | 11.33 |
|  | % purity | 99.98 | 99.98 | 99.98 |  |
| 50 | Flux, | 21.4 | 65 | 100 | 10.05 |
|  | % purity | 99.89 | 99.93 | 99.93 |  |
| 25 | Flux | 0.2 | 1.35 | 13.5 | — |
|  | % purity |  |  | 99.5 |  |

Permeation test was conducted at 330° C. with a Pd-membrane of 9.575 mmOD×40 mmL. The permeate was analyzed with a GC-FID and an online methanizer to convert CO and $CO_2$ into $CH_4$ for up to 1 ppm analysis of $CH_4$.

EXAMPLE 2

Hydrogen Permeation of $H_2$—Y Mixture with Y:$N_2$, $CO_2$ and Cyclohexanol (CXL)

The palladium membrane tube with 9.525 mm×30 mm (outside diameter×length) was used for hydrogen permeation test at 310° C. The results are shown in Table 2. The observed drop in hydrogen permeance is far more than can be accounted for by the decrease of hydrogen partial pressure. Moreover, dilution of hydrogen concentration brings about not only a decrease of hydrogen flux, but also a deterioration of the hydrogen purity in the permeation. Through the palladium membrane, an industrial grade of hydrogen having 99.995% purity can be purified to an electronic grade having 99.9999+purity, but the purity is decreased to 99.98%, 99.93% and 99.5% when hydrogen concentration is decreased to 70%, 50% and 25%, respectively.

The present invention provides a shell and tube reactor module having at least one palladium membrane tube, wherein the palladium membrane tube has one sealed end. It is illustrated in the following Example 3 and Example 4 that the palladium membrane tube is arranged "upstream" of the flowing path within the reactor module for significantly facilitating hydrogen permeation.

EXAMPLE 3

Direction of Hydrogen Permeation by a Pd-Membrane Tube with Respect to the Membrane Sealing A palladium membrane tube of 9.525 mmOD×150 mmL having one sealed end is inserted into a tubular reactor of 25.4 mmID×450 mmL in two modes of connections, [A] and [B]. In the [A]-mode, the sealed end of the membrane tube is arranged upstream of the hydrogen flow, and the hydrogen flows in both shell-side and tube-side co-current. In the [B]-mode, the sealed end of the membrane tube is arranged downstream of the hydrogen flow, and the hydrogen flows in the shell-side and tube-side. When the permeation pressure in the shell side is set at 3 bar, the hydrogen flux in the tube side in [A]-mode is 210 cc/min; the corresponding hydrogen flux in [B]-mode is 192 cc/min.

EXAMPLE 4

Direction of Hydrogen Permeation by a Pd/Ag-Membrane Tube with Respect to the Membrane Sealing Similar experiment of Example 3a was further tested with a 67/33 weight ratio of Pd/Ag alloy membrane tube of 25 μm thick on the similar porous support (9.525 mmOD×150 mmL) having one sealed end is inserted into a tubular reactor of 25.4 mmID×450 mmL in two modes of connections, [A] and [B] as described above. In the [A]-mode, the sealed end of the membrane tube is arranged upstream of the hydrogen flow, and the hydrogen flows in both shell-side and tube-side co-current. In the [B]-mode, the sealed end of membrane tube is arranged downstream of the hydrogen flow, and the hydrogen flows in the shell-side and tube-side. When the permeation pressure in the shell side is set at 3, 4, and 6 bar, the hydrogen flux in the tube side in [A]-mode is

TABLE 2

Hydrogen permeance with a mixed feed of $H_2$/Y (Y = $CO_2$, CXL or $N_2$.)[a]

| % $H_2$ in $H_2$/Y | Y | Flux, cc/min % purity | P, absol., bars 3 | 4 | 5 | Permeance, $M^3/M^2 - Hr^{-1} - atm^{1/2}$ |
|---|---|---|---|---|---|---|
| 99.995 |  | Flux, | 87.3 | 122 | 152 | 8.66 |
|  |  | % purity |  | 99.9999+ |  |  |
| 75 | CXL[b] | Flux, | 81 | 113 | 140 | 9.30 |
|  |  | % purity |  | 99.9999+ |  |  |
| 50 | CXL | Flux, | 24 | 35 | 47 | 5.08 |
|  |  | % purity | 99.992 | 99.994 | 99.996 |  |
| 50 | $N_2$ | Flux, | 20 | 34 | 42 | 4.48 |
|  |  | % purity |  | >99.9[c] |  |  |
| 50 | $CO_2$ | Flux, | 13 | 23 | 32 | 3.60 |
|  |  | % purity | 99.94 | 99.95 | 99.96 |  |

[a]Permeation test was conducted at 310° C. with a Pd-membrane of 9.575 mm × 30 mm (outside diameter × length). The products were analyzed with a GC-FID capable of detecting impurity up to 1 ppm. of $CO_x$ and other organic compounds.
[b]CXL = cyclohexanol.
[c]Analyzed with TCD with sensitivity to >0.5% of nitrogen in the permeate.

95, 136, and 189 cc/min, respectively; the corresponding hydrogen flux in [B]-mode is 80, 112, and 170 cc/min, respectively.

Hydrogen flux through palladium membrane is drastically decreased when hydrogen concentration is low as shown in Tables 1 and 2. It means that the palladium membrane tube is very inefficient in the low hydrogen concentration region. This surprised discovery practically limits the use of long length membrane tube during hydrogen production on large scale. Accordingly, the present invention provides a shell and tube reactor module having a short length of the palladium membrane tube. Preferably, the length of the palladium membrane tube is 3 cm to 120 cm. Moreover, in order to avoid using a long tube, an assembly 2 of shell and tube reactor modules is provided in the present invention as shown in FIG. 2.

Figure 2:
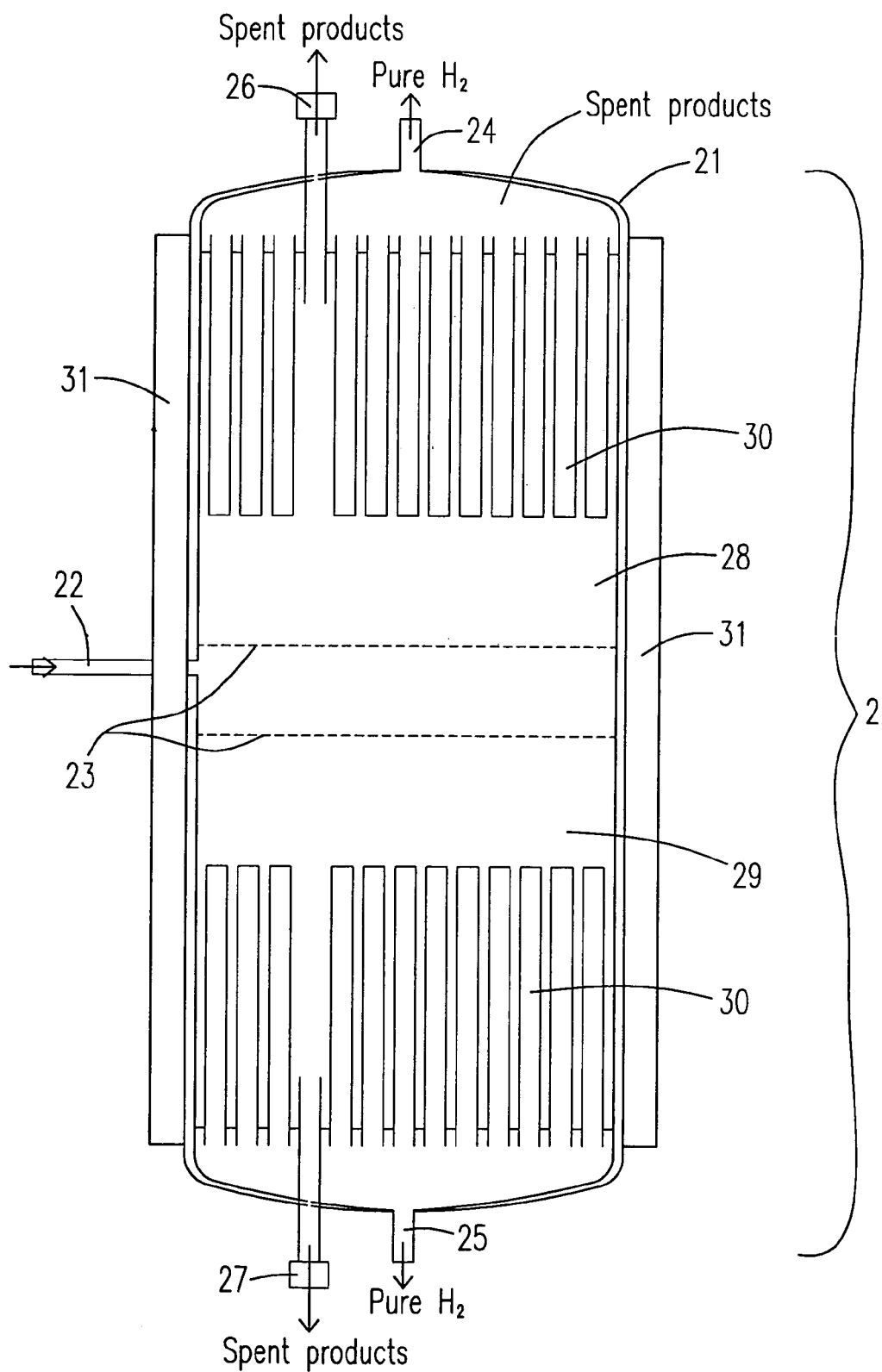
FIG. 2 is a schematic view showing an assembly of shell and tube reactor modules for hydrogen production according to the present invention.

Referring to FIG. 2, an assembly 2 of shell and tube reactor modules includes two reactor sections, 28 and 29 jointly having an extended common shell 21, an inlets 22, two vents 24 and 25, and two outlets 26 and 27. Two reactor sections, 28 and 29 are assembled to share the common inlet side and have flowing paths extending from the inlet to the outlet in the opposite direction of the two reactor sections, respectively. Each reactor section, 28 or 29 has a plurality of palladium membrane tubes 30. The palladium membrane tube 30 is formed by depositing a palladium membrane on a porous support for purifying hydrogen, wherein each palladium membrane tube 30 has one sealed end located upstream of the flowing path. The assembly 2 of shell and tube reactor modules further includes catalytic combustion sections 31 for heating the reactor sections, 28 and 29. The inlet 22 is configured to receive steam and a fuel. The fuel can be water, ethanol, methanol, isopropanol, hexane, gasoline or methane. The outlets 24 and 25 are configured to discharge pure hydrogen, and the vents 26 and 27 are configured to discharge spent products including $H_2$, CO and $CO_2$. The spent products discharged from the vents 26 and 27 are recycled and introduced into the catalytic combustion sections 31 through a connector (not shown) for combustion and the waste gases are discharged from the catalytic combustion section (not shown).

The assembly 2 of shell and tube reactor modules further includes a steam reforming catalyst and heat conductive perforated metal plates 23 welded to the reactor wall in each reactor section. Preferably, the steam reforming catalyst is $CuOZnOAl_2O_3$, $PdOCuOZnOAl_2O_3$ or $K_2O,NiO/\gamma-Al_2O_3$. The heat conductive plate facilitates heat transfer from the warmer reactor wall to the catalyst zone for the endothermic reaction.

According to the present invention, the catalytic combustion section has a noble metal catalyst dispersed on a supporting material for heating the reactor. The catalytic combustion section is formed of a stainless steel tube. Preferably, the noble metal is selected from a group consisting of platinum (Pt), palladium (Pd), rhodium (Rh), Ruthenium (Ru) and a mixture thereof. The supporting material is one selected from a group consisting of $\gamma$-alumina, titania, zirconia, silica, DASH220 and N220. The heating effect of the catalytic combustion section is illustrated as follows.

EXAMPLE 5

Cold Start Heating with Pt/BN Oxidation Catalyst

Figure 3:
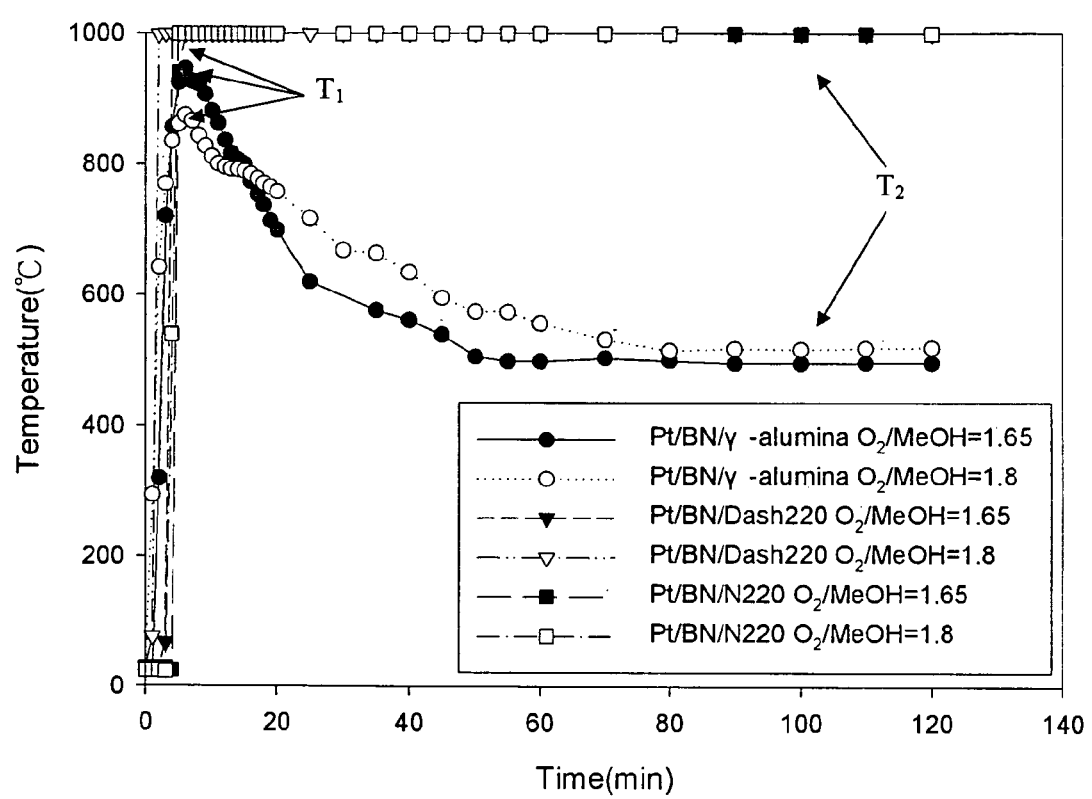
FIG. 3 is a temperature profile showing a catalytic combustion of methanol using various oxidation catalysts and oxygen/methanol ratios with WHSV=3.2 to start from room temperature, wherein $T_1$ represents the temperature at the peak and $T_2$ represents the temperature at the steady.

Six gram (6 g) of Pt/BN/$\gamma$-$AL_2O_3$ as oxidation catalyst was placed in a stainless steel tube with ½-inch OD (outside diameter), and then the whole tube was insulated with mineral wool. Two sets of temperature were measured by thermocouples as $T_a$ and $T_b$. $T_a$ indicates the temperature at the top of catalyst bed, and $T_b$ indicates the temperature outside of the tube and adjacent to the top of catalyst. Appropriate amount of methanol was pumped into the stainless steel tube at a desired space velocity (WHSV, $hr^{-1}$) and air was introduced to provide a mole ratio of $O_2$/Methanol close to 1.65 or 1.80 (corresponding to 10% and 20% excess of theoretical demand). As a result, the reaction temperatures indicated as $T_a$ and $T_b$ rose rapidly from room temperature to about 800° C. and then stabilized to a lower temperature of about 400-450° C. when a mole ratio of $O_2$/Methanol close to 1.65 or 1.80 is introduced at an appropriate space velocity of 2 to 4 $hr^{-1}$ (WHSV). In addition, the oxidation catalysts in the catalytic combustion section can be Pt/BN-N-220 and Pt/BN-Dash-220. The heating effect and cold start capability of Pt/BN-N-220 and Pt/BN-Dash-220 are shown in FIG. 3, wherein T1 represents the temperature at the peak and T2 represents the temperature at the steady.

EXAMPLE 6

High Temperature from the Cold Started Catalytic Combustion of Hexane with Pt/BN-N-220

Six gram (6 g) of PtBN/N-220 as oxidation catalyst was placed in the catalytic combustion section according to the present invention, and n-hexane as the combustion fuel was pumped onto the oxidation catalyst at a velocity of 1.66 gm/min. Then, airflow was introduced at a velocity of 2.35 L/min to give $O_2$/hexane close to 10.45 (10% excess of theoretical demand). The temperature indicated as $T_3$ in the catalyst zone rose to 630° C. in 4 min, and then to 970° C. in another 5 min. The temperature indicated as $T_4$ was held between 980° C. to 960° C. in the next 110 min until the reaction was terminated. Apparently, heat from combustion of hexane for maintaining the steady temperature, $T_4$, is much more than that of methanol. On the other hand, it is easier for methanol to initiate the oxidation reaction, and $T_1$ rises faster and higher initially than $T_3$.

A process of hydrogen production is provided in the present invention. The process of hydrogen production includes steps of feeding a fuel into a shell and tube reactor module comprising a reactor, wherein the shell has at least one inlet and at least one outlet, and the reactor is located in the shell and has a flowing path extending from the inlet to the outlet, a steam reforming catalyst, at least one tube and a palladium membrane covering on the at least one tube, and catalyzing a reaction of the fuel and the steam reforming catalyst for producing the hydrogen, wherein the at least one tube has one sealed end located upstream of the flowing path. The process further includes a catalytic combustion section located in the shell and tube reactor module and having a noble metal catalyst dispersed on a supporting material to heat the reactor. Preferably, the noble metal is selected from a group consisting of platinum (Pt), palladium (Pd), rhodium (Rh), Ruthenium (Ru) and a mixture thereof. Preferably, the supporting material is one selected from a group consisting of $\gamma$-alumina, titania, zirconia, silica, DASH220 and N220. Preferably, a length of the at least one tube is between 3 cm and 60 cm. Preferably, the palladium membrane which is covered on the at least tube is mounted on a porous support, and the porous support is formed of stainless steel. The at least one inlet is configured to receive a feed selected from a group consisting of water, a fuel and a mixture thereof, and the at least one outlet is configured to discharge the hydrogen. Preferably, the fuel is selected from a group consisting of ethanol, methanol, isopropanol, hexane and oil. Preferably, the steam reforming catalyst is $CuOZnOAl_2O_3$, $PdOCuOZnOAl_2O_3$ or $K_2O$, $NiO/\gamma-Al_2O_3$.

EXAMPLE 7

Cold Start of the Methanol Steam Reforming Reaction by a Catalytic Combustion of Aqueous Methanol Twelve grams (12 g) of $Pt/BN-\gamma-Al_2O_3$ as oxidation catalyst was placed in the catalytic combustion section of the present invention. 120 g of $CuO—ZnOAl_2O_3$ as steam reforming catalyst was placed in the reactor. The reactor was then wrapped with thick layer of mineral wool for insulation. Both inner catalyst zone and annular catalyst zone were independently connected with metering pumps for delivery of combustion fuel and methanol-water mixture for reforming, respectively. Initially, methanol as fuel at 7.5 mmol/min. corresponding to WHSV=1.2 was introduced into the combustion reactor at room temperature to set on the oxidation reaction by reacting with air at $O_2/CH_3OH$ close to 1.65 in 12 minutes. The temperature, $T_{OX}$, of the oxidation catalyst in the catalytic combustion section rose to 560° C. and almost simultaneously the temperature, $T_{SR}$, in the reactor reached to 380-390° C. The endothermic steam reforming reaction of methanol was then started up by introducing liquid methanol into the reforming catalyst bed at 15 mmol/min and introducing water at 18 mmol/min for $H_2O/CH_3OH$ close to 1.2. The reaction temperature, $T_{SR}$, dropped slightly to 350° C. and maintained steady for the next 60 minutes. Hydrogen and carbon oxides were produced from the reforming side of the reactor. Thereafter, the methanol fuel for combustion was changed to the aqueous $CH_3OH—H_2O$ mixture, and $T_{OX}$ in the catalytic combustion section dropped to 420-460° C. and $T_{SR}$ in the reformer decreased to 310° C. The lower temperature reactions were continued for another 30 minutes while gaseous products evolved smoothly.

EXAMPLE 8

Steam Reforming of Methanol

According to the present invention, a single Palladium membrane tube with 9 $cm^2$ membrane area was arranged in the shell and tube reactor module and the one sealed end of the palladium membrane tube was arranged upstream of the flowing path. Aqueous methanol ($H_2O/CH_3OH=1.1$) was fed into the reactor at 1.2 gm/min, wherein the reactor includes 18 g of $CuOZnOAl_2O_3$ catalyst (G-66B of Süd Chemie Japan Catalysts, Inc.) giving a space velocity of WHSV=4 $hr^{-1}$. The reaction was carried out at 310° C. under a pressure of 4.5 bars. The flowing rate of total products effluent and permeated pure hydrogen were 1,160 ml/min and 110 ml/min, respectively, and the hydrogen product was obtained with purity of 99.98%. Without the palladium membrane the total hydrogen effluent was 1,050 ml/min.

EXAMPLE 9

Steam Reforming Reaction of Hexane

According to the present invention, a steam reforming reaction of hexane was carried out at 500° C. under a pressure of 9 bars and VHSV of 10,000 to 30,000 $hr^{-1}$. Five steam reforming catalysts were tested for their carbon coking rate, conversion and the selectivity to hydrogen product. The characteristics of these catalysts are shown in Table 3 and their performance is presented in Table 4 for comparison. As shown in Table 3 and Table 4, both two commercial catalysts had higher decaying rate by coking than the three home made catalysts having higher surface area which also brought about higher hydrogen partial pressure and higher selectivity to hydrogen product. With regard to Y-2 catalyst, the use of Palladium membrane tube showed a much higher conversion, hydrogen partial pressure and the selectivity to hydrogen.

TABLE 3

Characteristics of catalysts used for the steam reforming of hexane

|  |  | G-56H-1 | FCR-4-02 | Y1 | Y2 | Y3 |
|---|---|---|---|---|---|---|
| Specific gravity (kg/l) | | 2.3 | 3.0 | 2.0 | 2.0 | 2.0 |
| Surface area ($m^2/g$) | | 27.41 | 6.73 | 145.32 | 133.6 | 131.44 |
| Pore volume (c.c./g) | | 0.054 | 0.014 | 0.365 | 0.338 | 0.32 |
| Pore size (Å) | | 78.8 | 87.6 | 100.33 | 101.1 | 97.3 |
| Support | | $\alpha-Al_2O_3$ | $\alpha-Al_2O_3$ | $\gamma-Al_2O_3$ | $\gamma-Al_2O_3$ | $\gamma-Al_2O_3$ |
| Content (wt. %) | Ni | 17.0 | 12.0 | 15.0 | 15.0 | 17.0 |
|  | $K_2O$ | 0.4 | — | 0.4 | 1.0 | 0.4 |
|  | MgO | — | — | — | — | 5.0 |

TABLE 4

The performances of steam reforming reaction of n-hexane[a]

| Catalysts | Av. Coking rate(mgC/g Cat-hr)[b] | n-Hexane Conv.(% mol) | Partial press of $H_2$ (%) | Gas composition (vol %) | | | |
|---|---|---|---|---|---|---|---|
|  |  |  |  | CO | $CO_2$ | $CH_4$ | $H_2$ |
| FCR-4-02 | 128.3 | 48.02 | 14.93 | 0.59 | 22.55 | 38.69 | 38.18 |
| G-56-H-1 | 13.29 | 65.84 | 12.15 | 0.56 | 21.64 | 50.23 | 27.57 |
| Y-1 | 8.23 | 39.54 | 20.85 | 1.39 | 20.25 | 16.46 | 55.96 |
| Y-2/Membr | 3.20 | 39.54 | 20.85 | 1.39 | 20.25 | 16.46 | 55.96 |
| Y-2 | 3.20 | 46.05 | 31.94 | 2.86 | 21.26 | 7.81 | 62.66 |
| Y-3 | 7.70 | 39.69 | 18.38 | 1.23 | 17.79 | 2.89 | 59.21 |

[a]VHSV = 20000 $h^{-1}$, $H_2O/C$ = 1.5, 9 atm, 500° C.
[b]Coking time of 6 hr under the conditions of [a]

EXAMPLE 10

Hydrogen Production from a Shell and Tube Reactor Module

According to the present invention, the shell and tube reactor module as shown in FIG. 1 included palladium membrane tubes in the reactor with 10 cmOD×25 cmH, in which each palladium membrane tube had 135 $cm^2$ of membrane surface area of in a stainless steel catalytic membrane reactor. Aqueous methanol was fed into the reactor giving a WHSV=2, and then the steam reforming reaction was carried out at 340° C. under a pressure varying from 5 to 8 bars from time to time. Permeation of hydrogen was obtained through the membrane to atmospheric pressure at 1000 ml/min, and the purity of the hydrogen was 99.97%. The hydrogen recovery was calculated to be 59% of the total hydrogen atoms available from the input methanol.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A shell and tube reactor module for hydrogen production, comprising:
    a reactor having a shell side, at least one palladium membrane tube as a tubular section, and a steam reforming catalyst section in said shell side; and
    a catalytic combustion section having an oxidation catalyst dispersed on a supporting material and surrounding the steam reforming catalyst section,
    wherein said at least one palladium membrane tube has one sealed end located at upstream of flowing path, and said oxidation catalyst is formed by a noble metal with boron nitride.

2. The shell and tube reactor module according to claim 1, wherein said palladium membrane tube is formed by mounting a palladium membrane on a porous support, wherein said palladium membrane is made of a material selected from the group consisting of palladium, a palladium-silver alloy and a palladium-copper alloy.

3. The shell and tube reactor module according to claim 2, wherein said porous support is made of stainless steel.

4. The shell and tube reactor module according to claim 1, wherein a length of said at least one tube is between 3 cm and 120 cm.

5. The shell and tube reactor module according to claim 1, wherein said steam reforming catalyst section comprises a catalyst selected from a group consisting of $CuOZnOAl_2O_3$, $PdOCuOZnOAl_2O_3$ and $K_2O,NiO/\gamma\text{-}Al_2O_3$.

6. The shell and tube reactor module according to claim 1, wherein said catalytic combustion section is made of a stainless steel.

7. The shell and tube reactor module according to claim 1, wherein said noble metal is selected from a group consisting of platinum (Pt), palladium (Pd), rhodium (Rh), Ruthenium (Ru) and a mixture thereof.

8. The shell and tube reactor module according to claim 1, wherein said supporting material is one selected from a group consisting of γ-alumina, titania, zirconia, silica, and the alumina deposited with platinum.

9. The shell and tube reactor module according to claim 1, further comprising a reservoir containing fuels without $H_2O$ provided for starting up heating.

10. An assembly of shell and tube reactor modules for hydrogen production, comprising a reactor splitting into two reactor sections and having a common shell, wherein each of said reactor sections has at least one palladium membrane tube as a tubular section and a steam reforming catalyst section; and
    a catalytic combustion section having an oxidation catalyst dispersed on a supporting material and surrounding the steam reforming catalyst section,
    wherein said at least one palladium membrane tube has one sealed end located at upstream of flowing path, and said oxidation catalyst is formed by a noble metal with boron nitride.

11. The assembly of shell and tube reactor modules according to claim 10, wherein said palladium membrane tube is formed by mounting a palladium membrane on a porous support.

12. The assembly of shell and tube reactor modules according to claim 11, wherein said porous support is made of stainless steel.

13. The assembly of shell and tube reactor modules according to claim 10, wherein a length of said at least one tube is between 3 cm and 60 cm.

14. The assembly of shell and tube reactor modules according to claim 10, wherein said steam reforming catalyst section comprises a catalyst selected from a group consisting of $CuOZnOAl_2O_3$, $PdOCuOZnOAl_2O_3$ and $K_2O$, $NiO/\gamma\text{-}Al_2O_3$.

15. The assembly of shell and tube reactor modules according to claim 10, wherein said catalytic combustion section is formed of stainless steel.

16. The assembly of shell and tube reactor modules according to claim 10, wherein said noble metal is selected from a group consisting of platinum (Pt), palladium (Pd), rhodium (Rh), Ruthenium (Ru) and a mixture thereof.

17. The assembly of shell and tube reactor modules according to claim 10, wherein said supporting material is one selected from a group consisting of γ-aluinina, titania, zirconia, silica, and the alumina deposited with platinum.

* * * * *